US009043942B1

(12) United States Patent
Birdwell Rockson et al.

(10) Patent No.: US 9,043,942 B1
(45) Date of Patent: May 26, 2015

(54) METHODS AND SYSTEMS FOR FACILITATING LIMITED ACCESS TO PAID-ACCESS OR REGISTRATION-REQUIRED CONTENT ITEMS VIA SEARCH ENGINE RESULTS, DIRECT WEB ADDRESSING OR INDIRECT LINKING

(71) Applicant: Inkling Systems, Inc., San Francisco, CA (US)

(72) Inventors: Ned Todd Birdwell Rockson, San Francisco, CA (US); Emily Ann Short, San Francisco, CA (US); Joshua John Forman, San Francisco, CA (US)

(73) Assignee: Inkling Systems, Inc., San Francisco, CA (US)

( * ) Notice: Subject to any disclaimer, the term of this patent is extended or adjusted under 35 U.S.C. 154(b) by 44 days.

(21) Appl. No.: 13/922,167

(22) Filed: Jun. 19, 2013

(51) Int. Cl.
*G06F 21/00* (2013.01)
*G06F 21/10* (2013.01)
*G06F 21/60* (2013.01)

(52) U.S. Cl.
CPC ............... *G06F 21/10* (2013.01); *G06F 21/60* (2013.01)

(58) Field of Classification Search
CPC ....... G06F 21/60; G06F 21/62; G06F 21/629; G06F 21/218; G06F 21/121
USPC ...................... 726/26, 27, 28, 31; 705/52, 53
See application file for complete search history.

(56) References Cited

U.S. PATENT DOCUMENTS 8,478,693 B1 * 7/2013 Weigle et al. .................. 705/51

OTHER PUBLICATIONS

Josh Cohen, "Google and paid content", Dec. 1, 2009, Google News Blog, pp. 1-2. http://googlenewsblog.blogspot.com/2009/12/update-to-first-click-free.html, Retrieved on Sep. 27, 2014.*

* cited by examiner

*Primary Examiner* — Edward Zee
(74) *Attorney, Agent, or Firm* — Ascenda Law Group, PC (57) ABSTRACT

Methods and systems for facilitating limited access to paid-access or registration-required content items. In one example, a server responds to a request for access to a restricted access content item (e.g., from a Web browser) by first determining whether a user associated with the request is already authorized to access the content item. If the user is so authorized, the user is allowed access to the content item. If the user is not already authorized, the server provides the user a limited preview of the content item. The limited preview is subject to preview rules associated with one or more of: a referral path by which the user (i.e., the browser) was directed to the content item, the content item itself, and previous accesses or access attempts by the user to the content item and other content items, access to which other content items is controlled by the server.

17 Claims, 6 Drawing Sheets

METHODS AND SYSTEMS FOR FACILITATING LIMITED ACCESS TO PAID-ACCESS OR REGISTRATION-REQUIRED CONTENT ITEMS VIA SEARCH ENGINE RESULTS, DIRECT WEB ADDRESSING OR INDIRECT LINKING

FIELD OF THE INVENTION

The present invention relates to methods and systems for facilitating limited access to paid-access or registration-required content items via search engine results, direct web addressing or indirect linking

BACKGROUND

The term "search engine optimization" (SEO) is broadly applied to any of several techniques used by content providers to enhance the visibility of their content (e.g., web sites and the like) in a search engine's natural or unpaid search results. It is generally agreed that results which appear closer to the top (or earlier) in a list of ranked search results will be more likely to be frequented by visitors than will results which appear lower (or later) in such a list. Consequently, content providers employ SEO methodologies in an effort to have their content appear as early as possible in such lists.

The effectiveness of any one or more SEO techniques depends on a variety of factors, including how different search engines index and/or catalog the subject content, the number of backlinks to the subject content, and how users of the search engines employ those tools. Thus, SEO techniques that may be effective for some search engines may not be as effective for others. Regardless of the particular techniques, however, all SEO methodologies are premised on the assumption that the subject content is visible to the search engine indexing processes and to users that employ the search engines and click through to that content when it is presented in the search results.

This requirement of visibility presents a problem for many content owners. For example, allowing "free" access to the content items (e.g., via search engine result-based links) would be problematic (perhaps antithetical) to any business model that depended on license fees or similar bases for granting access (generally referred to herein as "paid-access") to content items. Some content owners deal with this dilemma by making portions of individual content items freely available. For example, in the case of journal articles and the like, abstracts or similar summaries are often freely available and so can be indexed by search engines. As long as the abstract accurately captures the true nature of the underlying article this may be sufficient to permit the article to be included in search results, but it is unlikely that the abstract can be optimized in a way that it would enhance its position within such results. Therefore, the usefulness of such techniques as ways for content owners to attract potential new subscribers or purchasers is questionable.

The vast amount of content hidden behind subscription, registration or similar barriers is part of what is generally referred to as the "deep web" or "invisible web", referring to the fact that it is a collection of material that most Internet users are unaware of because it is never indexed by search engines. Recognizing that allowing users access to invisible web content will likely enhance the user's search experience, some search engine providers have implemented programs to allow content providers to have their paid-access or registration-required content indexed by their search engines. Under these programs, content providers must generally agree to allow users that find the content items through a search involving the subject search engine to see the full text of the subject document without charge and without need for registration. Subsequent attempts to access content from the content provider's site by clicking links in the original document may be restricted to those users who register and/or pay for such privileges. One such program implemented by Google Inc. is referred to as "First Click Free". In addition to allowing Google users free access to the full text of any document discovered through a Google search, the content providers must also provide unrestricted access to that document to the Googlebot—Google's web crawling and indexing bot or spider.

SUMMARY OF THE INVENTION

Described herein are methods and systems for facilitating limited access to paid-access or registration-required content items. In one example, a server responds to a request for access to a restricted access content item (e.g., from a Web browser) by first determining whether a user associated with the request is already authorized to access the content item. If the user is so authorized, the user is allowed access to the content item. If the user is not already authorized, the server provides the user a limited preview of the content item. The limited preview is subject to preview rules associated with one or more of: a referral path by which the user (i.e., the browser) was directed to the content item, the content item itself, and previous accesses or access attempts by the user to the content item and other content items, access to which other content items is controlled by the server.

In the foregoing example, if the server determines that the request for access to the restricted access content item is associated with a referral path from a search engine search result page, then the limited preview is provided in accordance with preview rules applicable to referrals from search result pages associated with the search engine. In other instances of referrals, the limited preview is provided to the user in accordance with preview rules concerning the content item itself and previous accesses or access attempts by the user to the content item and the other content items. The preview rules applicable to referrals from search result pages associated with the search engine may permit unlimited numbers of previews of the content item within a predetermined time period. Alternatively, or in addition, the preview rules applicable to referrals from search result pages associated with the search engine may permit a predetermined number of views of differing ones of the content items within a predetermined time period.

In the foregoing example, if the server determines that the request for access to the restricted access content item is associated with a referral path from a search engine search result page, the server may adjust a count of a number of accesses by the user via search engine search results as well as a count associated with a content work that includes the content item, determine whether any of the counts exceeds a respective permitted threshold, and permit or deny access to the content item according to whether or not one or more of the respective thresholds has been met or exceeded. In the event the user is permitted the limited preview of the content item, which limited preview may include navigation within the content work that includes the content item to a limited number of additional content items therein. Upon reaching navigation limits associated with the permitted navigation within the content item, the user is then presented a pay wall concerning the content item, which pay wall may provide options for the user to purchase access rights to the content item, navigate to related content items, log in as a registered user of a service associated with provision of the content item, create a user account, share comments regarding the content item (e.g., with social network contacts and/or others), etc.

In the foregoing example, if the server determines that the request for access to the restricted access content item is associated with a referral path other than that associated with a search engine search result page, the server may determine whether or not the user has met or exceeded a permitted number of accesses to the content item and, if so, deny the requested access, otherwise, adjust a count of a number of accesses by the user as well as a count associated with a content work that includes the content item, determine whether any of the counts exceeds a respective permitted threshold, and permit or deny access to the content item according to whether or not one or more of the respective thresholds has been met or exceeded. In the event the user is permitted the limited preview of the content item, that limited preview may include navigation within the content work with which the content item is associated to a limited number of additional content items. Upon reaching navigation limits associated with the permitted navigation within the content item, the user is presented a pay wall concerning the content item, which pay wall provides options for the user to purchase access rights to the content item, navigate to related content items, and to log in as a registered user of a service associated with provision of the content item.

BRIEF DESCRIPTION OF THE DRAWINGS

The present invention is illustrated by way of example, and not limitation, in the figures of the accompanying drawings in which.

DETAILED DESCRIPTION

Described herein are methods and systems for facilitating limited access to paid-access or registration-required content items via search engine results, direct web addressing or indirect linking. By "content items" we mean media objects, or portions thereof, that may be formatted according to a variety of computer-readable or interpretable formats, as described more fully below, and which include human perceptible (e.g., readable or recognizable) content, such as text, images (either still or moving), and/or interactive objects. In some instances, content items may be "cards" or "media cards", which are instantiations of markup language, e.g., extensible markup language ("XML"), hypertext markup language ("HTML"), or the like, files. Such cards may include, among other things, one or more text sections, one or more image sections, image captions, and header sections, all arranged in a desired order. A collection of related cards may form an electronic content work, for example an electronic book, magazine, article, etc., or a portion thereof, e.g., a section or chapter of a larger work, etc. These works may also be examples of content items.

As their name implies, paid-access or registration-required content items are generally not freely available to persons browsing the Web. Nor are they available for indexing via search engine web crawlers. Consequently, such content items are typically not included in search results. This presents a problem both for content owners seeking to monetize their content and for search engine operators seeking to provide optimum user experiences. If the content items do show up in search results, potential consumers may never learn of their existence and content owners may not realize possible sales. At the same time, search engine operators may lose potential users who become frustrated with seemingly less than optimal search results returned in response to queries.

These problems are solved, at least partially so, by the present invention, which, in various embodiments, facilitates the exposition of what would customarily be paid-access or registration-required content items to persons browsing the Web and to web crawlers such as the Googlebot. Such content items are made available without charge, to a limited degree, to users that navigate to the content items either directly, through a referral link from another web page, or from a link on a search engine search result page that was provided in response to a search query. By "limited degree" we mean for a limited time, a limited click-through depth, and/or a limited number of views (or, more generally, limits on a number of permitted user interface navigational activities related to the content item). In this way, content that was previously only available to registered users that had paid subscription or other license fees to be able to access the content is made available, in a limited fashion, to users that have not yet secured such rights, in part to act as an enticement for such users to purchase such rights. The limited degree availability is provided so long as the user has not exhausted his/her access rights to the content item, which access rights may be enforced on a time-period (e.g., hourly, daily, weekly, etc.) and/or number-of-view basis.

In order to ensure that the content items are exposed to users via search engine search results, the content items may be modified from their customary form to allow indexing by search engine crawlers. This may require the removal of certain digital rights management features or, in some cases, serving different forms of the content items to a search engine indexing robot than are served to users clicking through from search engine search results. Each content item (e.g., each media card) may be associated with its own uniform resource locator (URL) or other identifier so as to allow a search engine indexing tool to index the content item in a unique fashion. For example, each media card may represent a chapter, or portion thereof, of a book or other work. By providing each media card with its own URL, each card may appear uniquely in search results provided in response to a search query. In addition, each media card (or other content item) may be provided a rich title or other description to enhance the likelihood that it will appear near the top of any search result page in response to a search query that concerns the subject of the media card. Content items may also have micro data or other sematic content associated with them in order to enhance the likelihood their inclusion in (and near the top of) a search result list. Other SEO techniques may be employed on a per-content item basis in order to achieve such results.

Because the content items are normally provided on only a subscription or registration-required basis, user access to the content items must be tracked and, in accordance with embodiments of the present invention, limited. FIGS. 1-4 illustrate methods of providing such limited access in accordance with various embodiments of the present invention. Beginning with FIG. 1, at 10 a user arrives at a content item, which content item would usually be provided on only a subscription or registration-required basis. By "arrives" we mean that a Web browser or other client running on a computer-based platform operated by the user has requested from a server or other content delivery platform a copy of the content item. The content item may be a media card, group of media cards, a Web page, a group of web pages, an individual media object (such as an audio, video or audio-video file), etc. In one particular embodiment, the content item is a media card associated with an electronic content work, such as an electronic book, magazine, journal or other work. The card may comprise a chapter or a portion of a chapter of the work. The card may be a redacted or other modified version of the card included in the work or may be a complete version of such card in terms of its content. In some instances, the content item may have associated navigation options and/or widgets that are removed prior to serving the content item to the requesting browser.

A content distributor, such as a publisher or a provider of an electronic bookstore, may operate the server as part of a broader service offering. For example, the content distributor may operate a paid-access or registration-required service through which users may obtain (fee-based) access to electronic content works. An example of such a service is described in U.S. patent application Ser. No. 13/019,211, filed 1 Feb. 2011, incorporated herein by reference.

Figure 1:
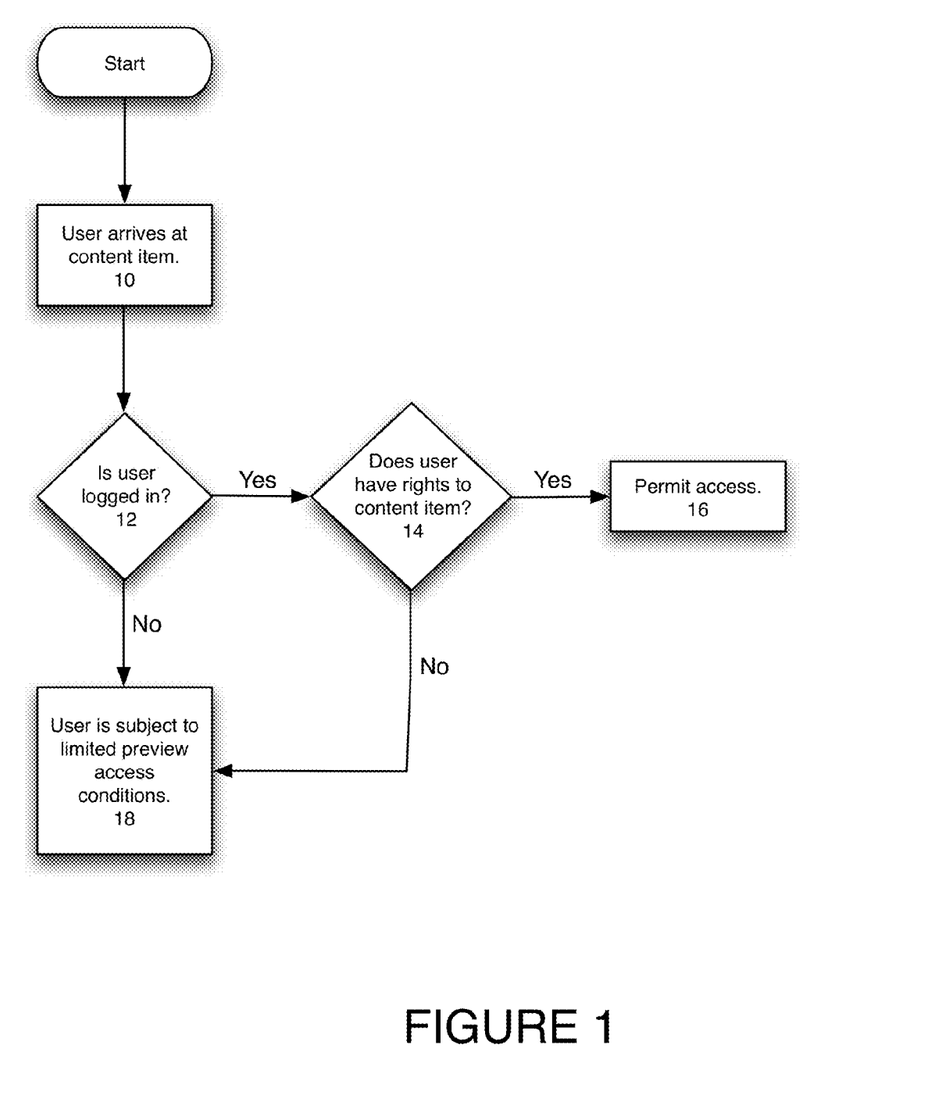
FIGS. 1-4 are flow diagrams illustrating methods of providing limited access to paid-access or registration-required content items by users lacking subscription, registration or other access rights to same in accordance with embodiments of the present invention.

In response to the user's arrival at the subject content item, at 12 the server determines whether the user is a registered user of the paid-access or registration-required service offered by the content distributor and, if so, whether the user is logger-in as a registered user. If the user is a registered user and is logged in to his/her account, at 14 the server determines whether the user already has access rights to the content item being requested. If the registered user already has such access rights, then at 16 he/she is permitted access to the content item in accordance with those preexisting access rights. However, if the user is not a registered user of the service or is not logged in to the service, or if the user is a registered user and is logged in but does not already have rights to access the subject content item, then at 18 the user is grated access privileges subject to the limited preview conditions described further below.

Figure 2:
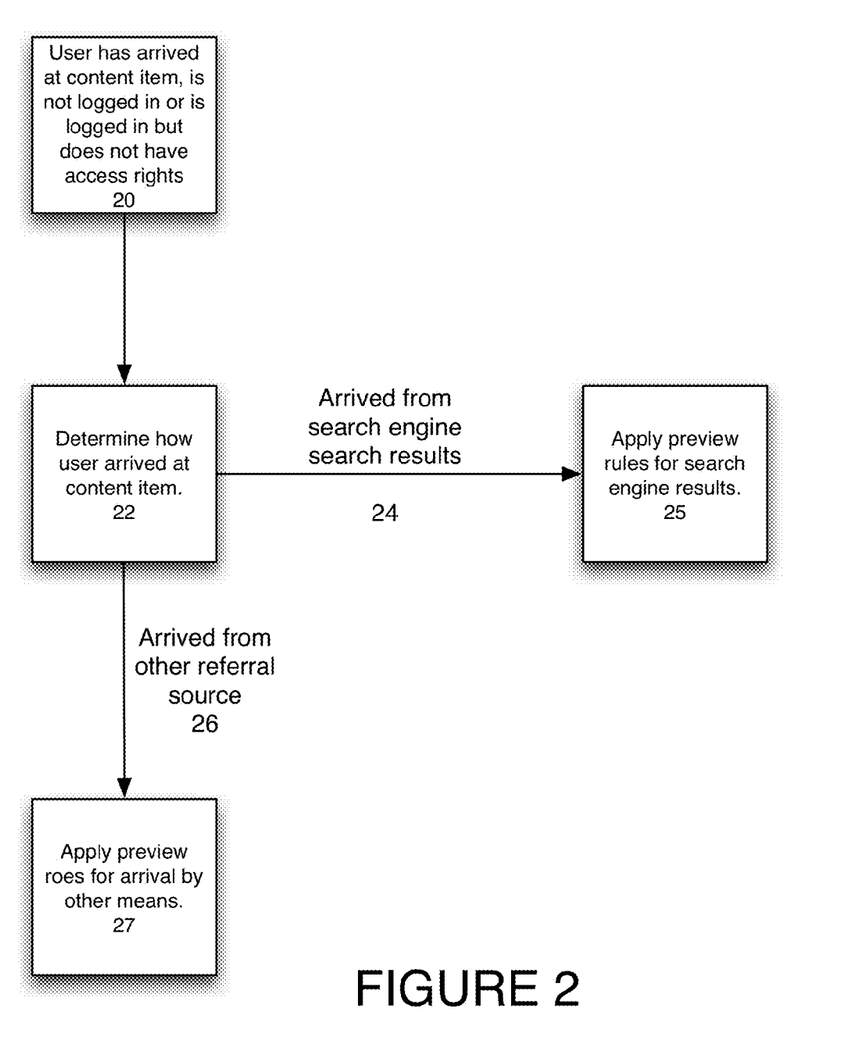

Turning now to FIG. 2, in situations where it has been determined that the user that arrived at the content item is either not a registered user of the service, may be a registered user but is not logged-in to his/her account, or is a registered user and is logged-in to his/her account but does not have access rights to the subject content item, 20, then at 22 the server makes a determination as to how the user arrived at the content item. Several different scenarios are possible. For example, the user may have arrived as the result of selecting a search engine search result 24. Or, the user may have arrived as a result of some other action 26. For example, the user may have arrived as a result of selecting a link from another referral source, such as a social media page or feed of a social media contact, a related content link such as those discussed further below, or another source. Alternatively, the user may have arrived as a result of a direct entry to a Web browser address field.

Where the user is determined to have arrived at the content item through a search engine search result referral link 24, then the server will provide subsequent accesses to the content item subject to preview limitations appropriate to such referral sources 25. Having such a servicing option allows for the service provider to accommodate any special rules regarding access to paid-access or registration-required content imposed by search engine providers that index such content. Alternatively, where the user is determined to have arrived through a path other than a search engine search result referral link, 26, the server will provide subsequent accesses to the content item subject to preview limitations appropriate to those referral sources 27. In some cases, where no distinction is made between referral sources, the preview limitations 25 and 27 may be the same, but in general they are not.

Figure 3:
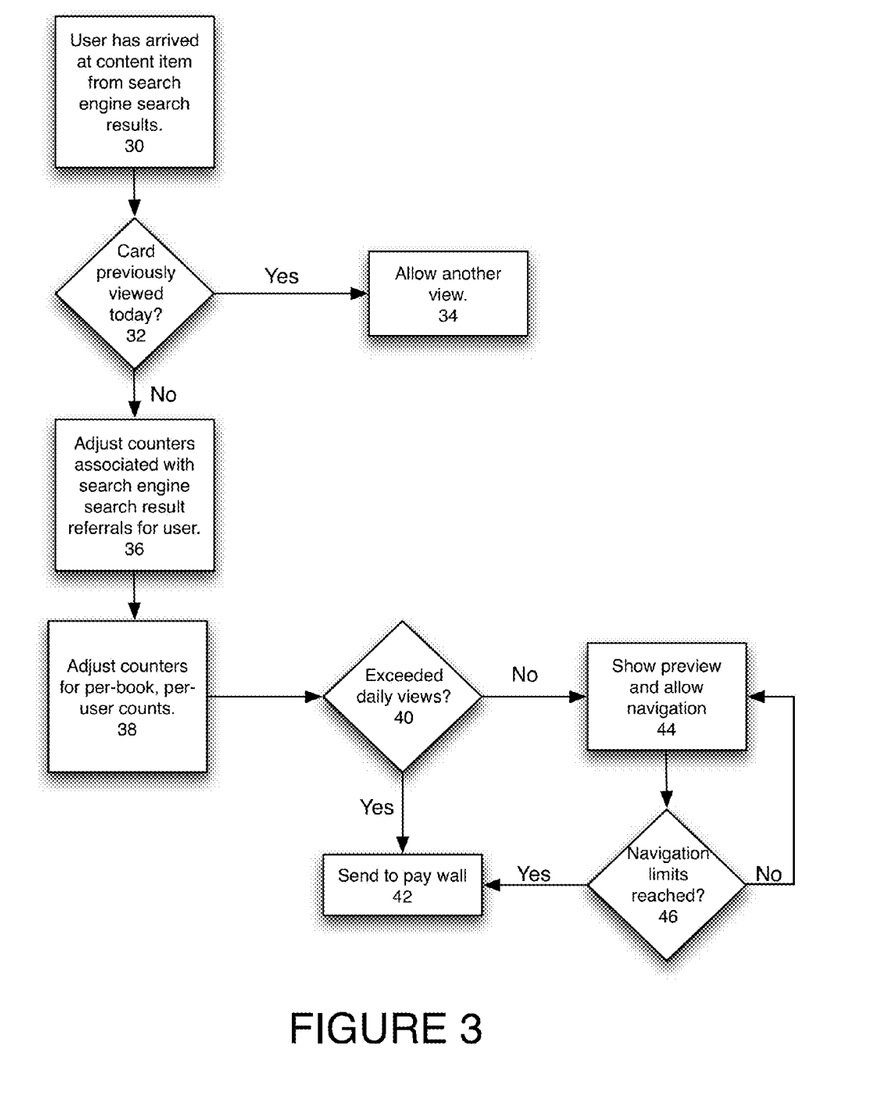

FIG. 3 illustrated an example of a process for permitting limited previews of content items that typically require subscriptions or other access privileges in instances where users have arrived at the content item through a search engine search result referral link 30. In this example, the server first determines whether the user has previously viewed the subject content item (e.g., a card) within a predetermined time period 32, for example, the same day as the current access attempt. If so, the user may be provided further access to the subject content item without affecting the user's other access privileges 34. This privilege allows the user unlimited viewing of a subject content item that typically requires subscription or other access privileges within a predetermined time period, such as a single day. In other embodiments, however, this privilege is not provided and all accesses to a content item (whether within a same day or other time period or not) are assessed to determine whether a user has exceeded his/her limited viewing rights.

If the user has not previously viewed the subject content item within the predetermined time period 32, or if the above-described privilege is not afforded in a particular embodiment or with respect to certain search engine search result referrals, then at 36 the server adjusts a user-specific counter associated with content item accesses from search engine search result referrals. In some instances the counter may be adjusted by incrementing same (e.g., where a count-up methodology is employed to determine whether or not a user has exceeded his/her number of permitted views) while in other instances it may be decremented (e.g., where a count-down methodology is employed to determine when a user has exhausted his/her permitted number of views). Whether a count-up or count-down methodology is employed, the server tracks, on a per-user basis, the number of times a subject user access paid-access or registration-required content items through referral links from a subject search engine referral source. Such accesses may be limited to a predetermined number of accesses per time period (e.g., per-day, per-week, per-hour, etc.). Such user access attempts may be tracked via any identifier that is uniquely or nearly uniquely associated with a user. For example, an Internet Protocol (IP) address associated with the Web browser used by the user. It is recognized that the IP address may not be entirely unique per user (e.g., where multiple users share a common Internet gateway that employs natural address translation for clients operating behind the gateway), however, in those instances, IP duplication is either ignored (and so some number of individuals with clients that operate behind the gateway may be grouped together for purposes of limiting access to content items), or information in addition to IP address (e.g., such as browser type, version, etc.) may be tracked in order to better uniquely identify each user. The server may store such information as individual user profiles in one or more associated database that are consulted each time a new content item access is assessed.

In addition to adjusting the counts for accesses associated with search engine search result referrals, at 38 the server also adjusts (e.g., either increments or decrements, according to whether a count-up or count-down methodology is employed) counters associated with accesses by the user on a per-content item basis, per-time period basis and/or other basis. For example, each user may have associated counters that track accesses on a per-content item basis, a per-electronic content work basis, a per-time period basis and/or other bases. In this way, the number of times a particular content item (regardless of the referral source to the content item), or different content items of the same content work, are viewed may be limited. So too may a particular user be limited in the total number of content item previews (regardless of content item or content work) he/she is permitted per-day, per-week, per-hour, etc.

At 40 the server determines whether the user has reached or exceeded any limits on the number of permitted content item views. This is done by comparing the user's current counts to thresholds against which such limits are evaluated. For example, the number of search engine search result referrals may be limited to a specified number per-day, per-week, per-hour, etc. The server determines whether this particular threshold has already been met or exceeded by this particular user. Likewise, the server may determine whether the user has met or exceeded the number of permitted accesses of a content item, a work within which the content item is included and/or a number of permitted accesses per time period. Not all threshold limit evaluations may be treated equally, For example, if a current access is via a search engine search result referral link and the user has not yet met or exceeded his/her limit of such accesses, then the user may be permitted access to the subject content item of the search engine search result referral link even if that user has already met or exceeded his/her limits of content previews assessed through other means. This may be necessary for the service provider to comply with contractual obligations on having the search engine indexing tool include the content items in search engine indices.

Subject to such weightings or preferential treatment of thresholds, if the user has met or exceeded his/her limits on previews of the subject content item or content items in general, then he/she is directed to a so-called "pay wall" 42. The pay wall is a web page at which the user is informed that he/she will not be permitted to view the requested content item because of the limits discussed above and offers the user several navigation options. For example, the user may be offered the opportunity to purchase access rights to the subject content item or the work in which it is included. The access rights may be for a limited or unlimited period of time, and pricing may be offered according to such access periods. In addition, the user may be provided with the option to log-in to his/her account with the service provider. If the user already has access rights to the content, this affords the user a convenient way to enjoy unrestricted access to the subject content item. Further, the user may be presented with links to similar or related content items, e.g., from other content works. This allows the user to continue browsing, without having to pay for access to content items, but subject to the limits on free previews as discussed below. Of course, the user may also be provided with options to navigate away from content items associated with the subscription service or with other options as well.

If, at 40, the server determines that the user has not met/exceeded his/her limits on content item viewing, then at 44 the server returns the subject content item to the requesting browser and the user is permitted to view the content. As part of the reading/viewing experience the user is able to navigate (in a limited fashion), for example by requesting additional pages/views 46. Such additional pages/views (where a page may be a new content item, e.g., a next chapter or sub-chapter, etc.) may be provided to a limited depth (e.g., no more than one or two clicks from the original content item) until the user is presented with the pay wall 42. In some cases, the navigation to new content items after receiving access to the original content item will be assessed according to one or more of the counts and thresholds discussed above, while in other instances such navigations are subject to different counts and thresholds. For example once access to a content item has been granted, the user may be permitted to navigate to a certain depth (e.g., a certain number of clicks) irrespective of the means by which the user arrived at the original content item and irrespective of whether or not such navigation would exceed one or more of the per-time period or per-content work counts/thresholds described above.

Figure 4:
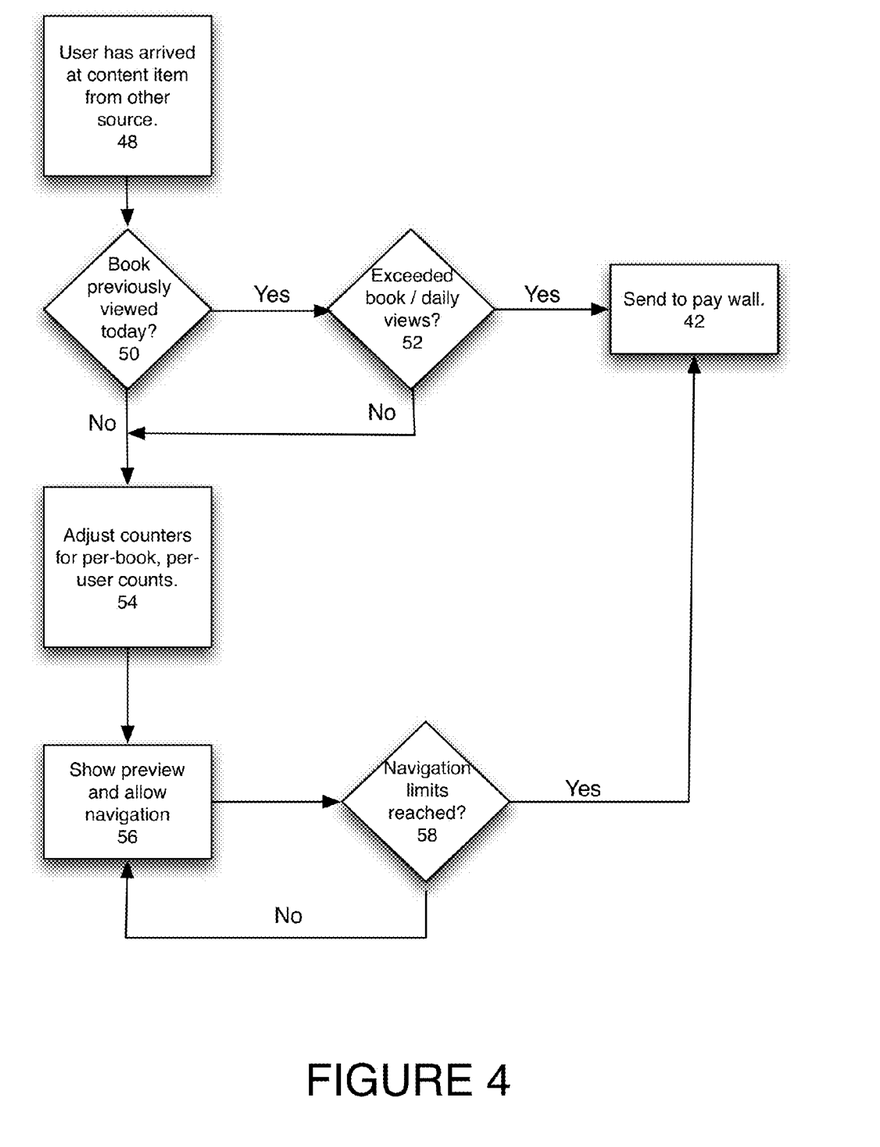

Turning now to FIG. 4, this scenario depicts situations where a user has arrived 48 at a content item from a referral source other than a search engine search result link. At 50, the server determines whether the user has previously viewed this particular content item within a specified time period (e.g., a day, a week, an hour, etc.). If so, then at 52 the server determines whether the user has met/exceeded the number of permitted views of the content item for the specified time period. As indicated above, this assessment may be based on an evaluation of counts and thresholds for different events, for example a number of accesses per content item and/or content work per day. If the user has already met/exceeded his/her number of permitted accesses for the content item (or the associated content work), then the user is presented with the pay wall 42.

If, however, the user has not exceeded his/her number of permitted accesses, then the appropriate counters are adjusted (e.g., incremented or decremented as appropriate for the count methodology) 54, and the user is provided with access to the content item 56. This access may include the user being provided some navigation abilities and so long as the navigations limits are not exceeded 58, the user is allowed to navigate within the content work. When the navigation limits have been met, the user is directed to the pay wall 42. As indicated above, the navigation limits may be based on the counts/thresholds associated with per-content work/per-time periods discussed above, or may be different counts/thresholds imposed on a per content work or other basis. For example, for some content works, no further navigation may be permitted. For others, a limited number of clicks to other content items in the content work may be allowed. This may be controlled on a per-content work or other basis (e.g., the navigation limits may be the same for all content works in some cases).

A further scenario in which the methods of the present invention find application involves a user that is browsing a content item or content work to which he/she has access privileges and who then selects a link to a content item/content work for which he/she does not have access privileges. This may arise, for example, in cases where users purchase individual chapters of a larger content work, but then attempt to access chapters they have not yet purchased. Such instances may be treated as if they were cases of users arriving at content items from sources other than search engine search result links and the users may be permitted limited access to the content items before hitting a pay wall as described above with reference to FIG. 4.

Various enhancements of the above-described methods may be offered. For example, in cases where a user arriving at content items are recognized by the server as registered users of the service, the content items may be provided in reading environments associated with the service. That is, the content items may be provided to the user within Web-based or dedicated readers associated with the service, affording such users access to reading/viewing tools that might not otherwise be available if the content items are served only as Web pages to a Web browser. In some cases, the use of dedicated readers and the like may violate terms of service for referrals from search engine search result links, in which case even for registered users the content items may have to be provided as Web pages in a Web browser.

In addition, some portions of content works that may be accessed from a content item provided in accordance with the above-described methods may not count against navigation views allocated for a user. For example, accesses of a table of contents, glossary or other portion of a content work may be provided without charge and without counting against a number of permitted views for a user.

Important for the above-described processes is the ability of the server to identify (as uniquely as possible) individual users and the referral path to a content item by which the user arrives. Users may be identified and tracked in a number of ways including by IP addresses and/or other information received when a user arrives at a content item, and/or cookies or other means installed on the user's client machine by the server. For example, by logging IP addresses together with identifying information provided by a requesting browser (up to 21 bits of information in some instances), users can be identified to a nearly certain uniqueness. In some cases, ever-cookies or flash cookies may be used so as to prevent users circumventing the count/threshold limits described above. Referral paths can be tracked through information provided by a requesting browser (e.g., a refer header).

Also important to the above-described methodologies is the ability to define, on a per content work basis, the thresholds for permitted views. By defining such items on a per-content work basis, content owner limits can be respected. The server therefore maintains and has access to one or more databases that include information defining such limits.

From the above discussion it should be apparent that instantiations of the methods or processes described herein may be executable as computer software (i.e., computer readable instructions) on various computer-based (or processor-based) devices. Such devices may include any electronic device capable of performing the actions described above (using suitable programming) and, where applicable, processing the information for display so as to properly convey the information. Examples of such devices include servers, personal computers, tablet computers, smart phones and the like, which devices include one or more processors that are temporarily configured (e.g., by software) or permanently configured to perform the relevant operations. Where the present methods are instantiated as software, such software may be written in any form of programming language, including compiled or interpreted languages, and it may be deployed in any form, including as a stand-alone program or as a module, subroutine, or other unit suitable for use in a computing environment. The software may be deployed to be executed on one computer system or on multiple computer systems at one site or distributed across multiple sites and interconnected by a communication network. At times, the software may be embodied on a computer program product, for example as a computer program tangibly embodied in an information carrier such as a non-transitory machine-readable medium, for execution by, or to control the operation of, a programmable processor. Example embodiments may also be implemented in digital electronic circuitry, in firmware, or in various combinations of circuitry, firmware and software.

Figure 5:
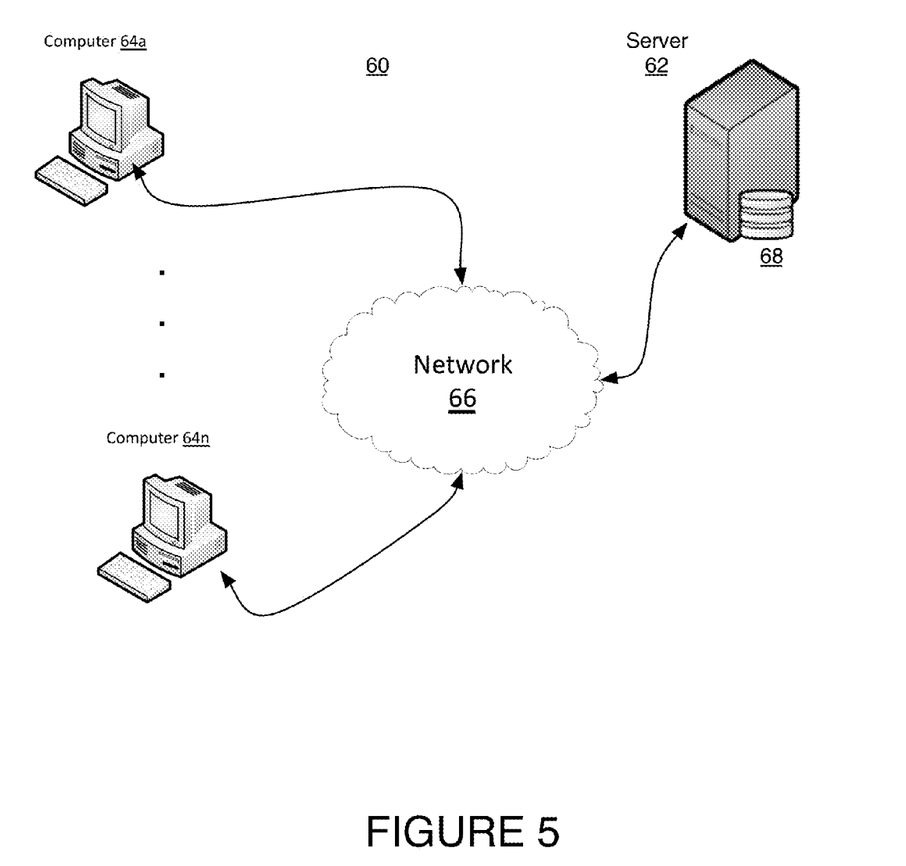
FIG. 5 illustrates an example of a network within which content items may be distributed by a server to various client computers in accordance with embodiments of the present invention.
Figure 6:
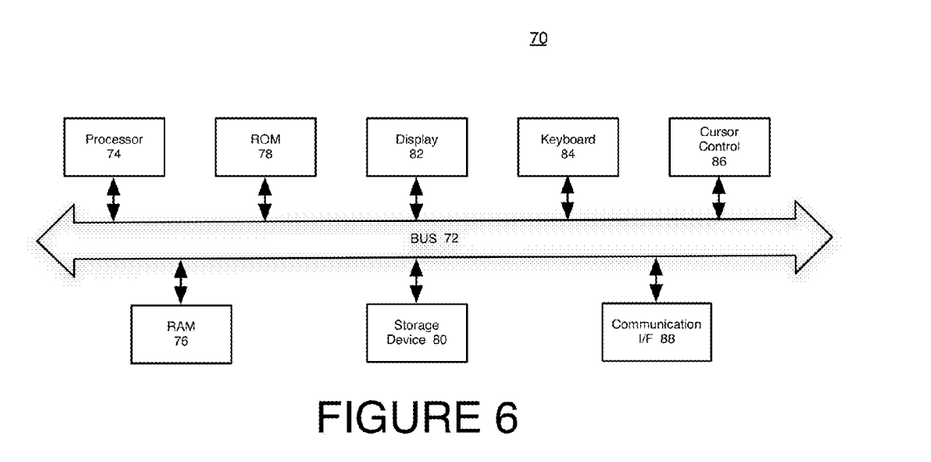
FIGS. 6 and 7 illustrate examples of computing environments suitable for use in accordance with embodiments of the present invention.
Figure 7:
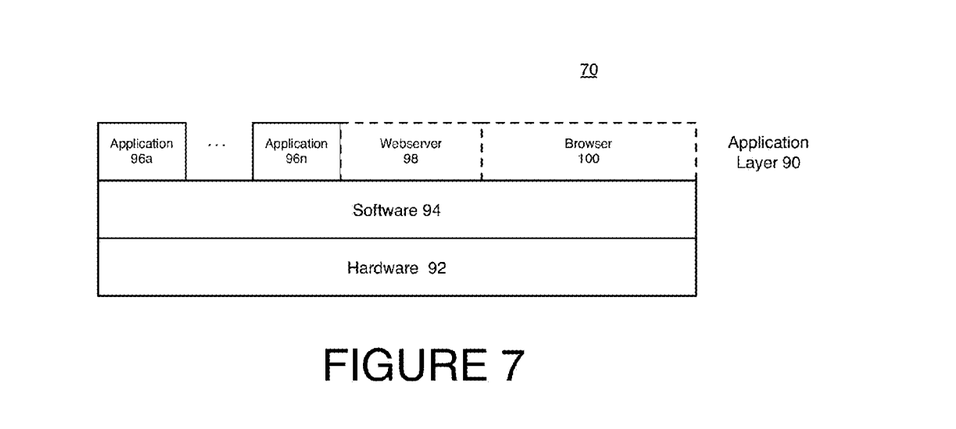

FIGS. 5-7 illustrate examples of computing environments within which the methods of the present invention may be practiced. For example, computer system 60, shown in FIG. 5, may include a server 62, configured to perform the operations discussed above in connection with delivering limited access to content items to client computers 64a-64n communicatively coupled to server 62 via one or more computer networks 66. One or more databases 68 accessible to server 62 may store the various counts/thresholds and/or user/content work profiles discussed above.

FIG. 6 illustrates a computing environment 70, which in various instantiations may be a server or client computer. Note, not all of the various computer systems may have all of the features of computing environment 70. For example, certain of the servers discussed above may not include a display inasmuch as a client computer communicatively coupled to the server may provide the display function. Such details are not critical to the present invention.

Computing environment 70 includes a bus 72 or other communication mechanism for communicating information, and a processor 74 coupled with the bus for processing information. Computing environment 70 also includes a main memory 76, such as a random access memory (RAM) or other dynamic storage device, coupled to the bus for storing information and instructions to be executed by the processor. Main memory 76 also may be used for storing temporary variables or other intermediate information during execution of instructions to be executed by processor 74. Computing environment 70 further includes a read only memory (ROM) 78 or other static storage device coupled to the bus for storing static information and instructions for the processor 74. A storage device 80, which may be one or more of a hard disk, flash memory-based storage medium, or other non-transitory storage medium, is provided and coupled to the bus 64 for storing information and instructions (e.g., operating systems, applications programs and the like).

Computing environment 70 may be coupled via the bus 72 to a display 82, such as a liquid crystal or light emitting diode display, for displaying information to a user. An input device 84, such as a keyboard including alphanumeric and other keys, is coupled to the bus for communicating information and command selections to the processor. In some embodiments, the keyboard will be a software construct rendered via a touch screen display. Another type of user input device is cursor control device 86, such as a mouse, a trackball, or cursor direction keys for communicating direction information and command selections to processor 74 and for controlling cursor movement on the display. Where a touch screen display is used, cursor control functions may be implemented using finger-based gestures directly on the display. Other user interface devices, such as microphones, speakers, etc. are not shown in detail but may be involved with the receipt of user input and/or presentation of output.

The processes referred to herein may be implemented by processor 74 executing appropriate sequences of computer-readable instructions contained in main memory 76. Such instructions may be read into main memory from another computer-readable medium, such as storage device 88, and execution of the sequences of instructions contained in the main memory causes the processor to perform the associated actions. In alternative embodiments, hard-wired circuitry or firmware-controlled processing units may be used in place of or in combination with processor 74 and its associated computer software instructions to implement the invention.

Computing environment 70 also includes a communication interface 88 coupled to the bus. Communication interface 88 provides a two-way data communication channel with a computer network, such as network 66 in FIG. 5, which provides connectivity to and among the various devices discussed above. For example, communication interface 88 may be a local area network (LAN) card (wired and/or wireless) to provide a data communication connection to a compatible LAN, which itself is communicatively coupled to the Internet through one or more Internet service provider networks. The precise details of such communication paths are not critical to the present invention. What is important is that computing environment 70 can send and receive information through the communication interface and in that way communication with other computer systems are possible. Computing environment 70 may also include additional capabilities and facilities, such as a power unit, which may comprise a battery, a power port, one or more antennae, one or more data ports, and one or more wireless communication modules.

FIG. 7 illustrates computing environment 70 from the point of view of its software architecture. Computing environment 70 may be any of the clients or servers referred to above, with appropriate applications comprising a software application layer 90. The various hardware components of computing environment 70 are represented as a hardware layer 92. An operating system 94 abstracts the hardware layer and acts as a host for various applications 96*a*-96*n* that run within computing environment 70. In the case of a server, the operating system may act as a host for a webserver application 98, which is configured to perform the processes described above. For a client computer, the operating system may host a Web browser application 100.

In the foregoing description, certain flow diagrams have been shown and processes described in relation to those diagrams that provide a reference for discussion purposes. In an actual implementation of the methods of the present invention, the steps can comprise event-driven routines that can run in parallel and can be launched and executed other than as shown by the simple depiction in the flow diagrams. In short, the particular order of the steps in the diagrams is illustrative of the invention, but not limiting of the various permutations that can be achieved in a given embodiment. Accordingly, it is the performance of the steps recited in the claims appended below which is pertinent, and not the order of operation of the steps themselves.

Thus, methods and systems for facilitating limited access to paid-access or registration-required content items via search engine results, direct web addressing or indirect linking have been described.

What is claimed is:

1. A method, comprising, at a server, responsive to a request for access to a restricted access content item, determining whether a user associated with the request is already authorized to access the content item and, if so, allowing the user access to the restricted access content item, otherwise, providing the user a limited preview of the restricted access content item, said limited preview subject to preview rules associated with one or more of: a referral path by which the user was directed to the restricted access content item, the restricted access content item itself, and previous accesses or access attempts by the user to the restricted access content item and other content items, access to which other content items is controlled by the server, the method further comprising wherein if the server determines that the request for access to the restricted access content item is associated with a referral path from a search engine search result page, the server adjusts a count of a number of accesses by the user via search engine search results as well as a count associated with a content work that includes the restricted access content item, determines whether any of the counts exceeds a respective permitted threshold, and permits or denies access to the restricted access content item according to whether or not one or more of the respective thresholds has been met or exceeded.

2. The method of claim 1, wherein if the server determines that the request for access to the restricted access content item is associated with the referral path from the search engine search result page, then said limited preview is provided to the user in accordance with preview rules applicable to referrals from search result pages associated with the search engine, otherwise, said limited preview is provided to the user in accordance with preview rules concerning the restricted access content item itself and previous accesses or access attempts by the user to the restricted access content item and the other content items.

3. The method of claim 2, wherein the preview rules applicable to referrals from search result pages associated with the search engine permit unlimited numbers of previews of the restricted access content item within a predetermined time period.

4. The method of claim 2, wherein the preview rules applicable to referrals from search result pages associated with the search engine permit a predetermined number of views of differing ones of the content items within a predetermined time period.

5. The method of claim 1, wherein if the user is permitted the limited preview of the restricted access content item, said limited preview includes navigation within the content work to a limited number of additional content items.

6. The method of claim 5, wherein upon reaching navigation limits associated with the permitted navigation within the restricted access content item, the user is presented a pay wall concerning the restricted access content item.

7. The method of claim 6, wherein the pay wall provides options for the user to purchase access rights to the restricted access content item, navigation to related content items, and to log in as a registered user of a service associated with provision of the restricted access content item.

8. The method of claim 1, wherein the limited preview of the restricted access content item includes navigation within a content work that includes the restricted access content item up to predetermined navigations limits which, once met, cause further navigation attempts to deliver the user to a pay wall that provides options for the user to purchase access rights to the restricted access content item, navigate to related content items, and to log in as a registered user of a service associated with provision of the restricted access content item.

9. A method, comprising, at a server, responsive to a request for access to a restricted access content item, determining whether a user associated with the request is already authorized to access the content item and, if so, allowing the user access to the content item, otherwise, providing the user a limited preview of the content item, said limited preview subject to preview rules associated with one or more of: a referral path by which the user was directed to the content item, the content item itself, and previous accesses or access attempts by the user to the content item and other content items, access to which other content items is controlled by the server, the method further comprising wherein if the server determines that the request for access to the restricted access content item is associated with a referral path other than that associated with a search engine search result page, the server determines whether or not the user has met or exceeded a permitted number of accesses to the restricted access content item and, if so, denies the requested access, otherwise, the server adjusts a count of a number of accesses by the user as well as a count associated with a content work that includes the restricted access content item, determines whether any of the counts exceeds a respective permitted threshold, and permits or denies access to the restricted access content item according to whether or not one or more of the respective thresholds has been met or exceeded.

10. The method of claim 9, wherein if the user is permitted the limited preview of the restricted access content item, said limited preview includes navigation within the content work to a limited number of additional content items.

11. The method of claim 10, wherein upon reaching navigation limits associated with the permitted navigation within the restricted access content item, the user is presented a pay wall concerning the content item.

12. The method of claim 11, wherein the pay wall provides options for the user to purchase access rights to the restricted access content item, navigate to related content items, and to log in as a registered user of a service associated with provision of the restricted access content item.

13. A method, comprising determining whether or not to grant preview access to a restricted-access content item according to a referral path by which a Web browser was directed to the restricted-access content item, counts concerning access by a particular user to the restricted-access content item itself, and previous accesses or access attempts by the user to other content items, access to which other content items is controlled in a manner similar to that for the restricted-access content item, wherein, responsive to a request for access to the restricted-access content item, if the request for access to the restricted-access content item is associated with a referral path from a search engine search result page, a count of a number of accesses by the user via search engine search results as well as a count associated with a content work that includes the restricted access content item are adjusted and access to the restricted-access content item is permitted or denied according to whether or not one or more respective thresholds associated with each of the counts has been met or exceeded.

14. The method of claim 13, wherein preview access comprises viewing access to the restricted-access content item as well as limited navigation within a content work within which the restricted-access content item is included, said limited navigation being defined by a threshold beyond which navigation attempts direct the Web browser to a pay wall.

15. The method of claim 14, wherein the pay wall provides options for a user to: (a) purchase access rights to the restricted-access content item, (b) navigate to related content items, and (c) log in as a registered user of a service associated with provision of the restricted-access content item.

16. The method of claim 14, wherein the pay wall provides options for a user to share comments regarding the restricted-access content item.

17. The method of claim 14, wherein the pay wall provides options for a user to create a user account.

* * * * *